INVENTOR.
EDWIN ZUCKER

United States Patent Office 3,595,772
Patented July 27, 1971

---

3,595,772
**METHOD OF BREAKING PARTICLE AGGLOMER-
ATES IN THE PHOTO ELECTROPHORETIC
IMAGING SYSTEM**
Edwin Zucker, Rochester, N.Y., assignor to Xerox
Corporation, Rochester, N.Y.
Filed Oct. 3, 1968, Ser. No. 764,721
Int. Cl. G03g 13/22
U.S. Cl. 204—181          5 Claims

---

ABSTRACT OF THE DISCLOSURE

This invention relates to a method and apparatus for creating high shear stresses in a particulate suspension prior to use of such suspension for imaging or inking. The method and apparatus in one environment function to stress a thin layer of an electrophoretic suspension of particles in a liquid carrier. The prestressed suspension is better suited than unstressed suspensions for preparing both monchromatic and polychromatic copies from originals by particle migration through the suspension when it is exposed to electromagnetic radiation in image configuration while in an electric field across the suspension between two electrodes. The method and apparatus is also used for printing inks in order to form a prestressed, uniform, thin layer of the ink for application to the press.

---

Figure 1:
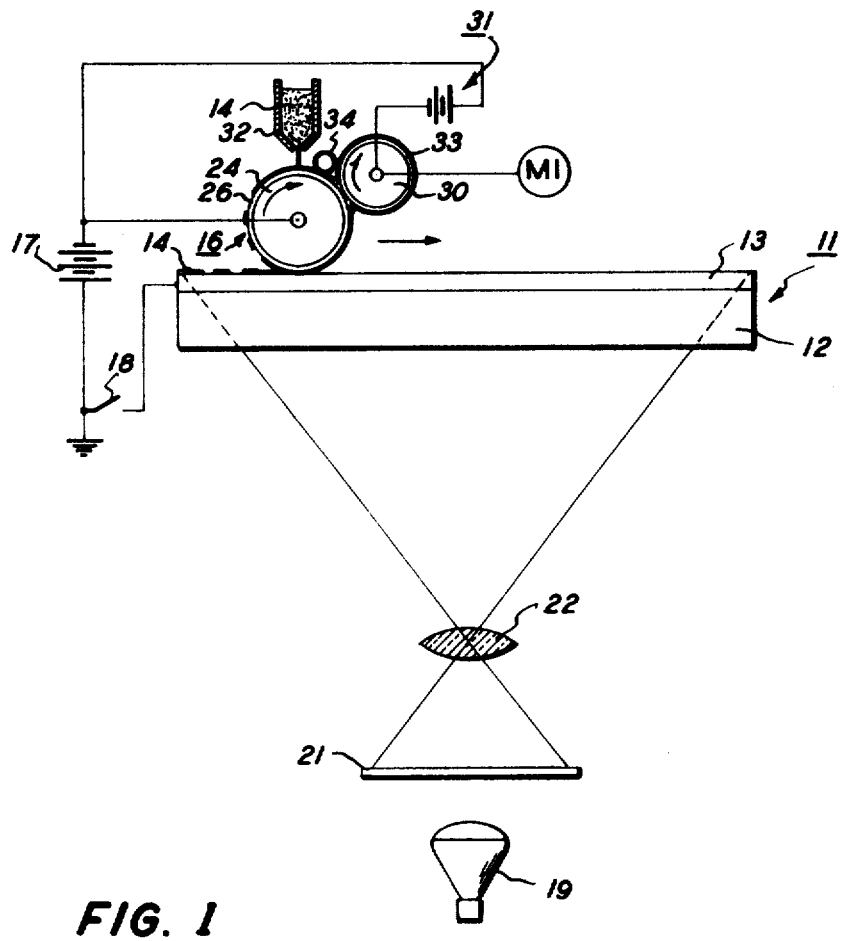

This invention relates in general to stressing particle suspensions for breaking interparticle bonds and more specifically to a system for prestressing suspensions for better use in forming copies from an original or in inking.

A new imaging system in which one or more types of photosensitive radiant energy absorbing particles believed to bear a charge when suspended in a non-conductive liquid carrier, and placed in an electrode system and exposed to an image radiation configuration has recently been described. See Pat. No. 3,384,565 issued May 21, 1968 in the names of V. Tulagin and L. M. Carreira. The particles in this system migrate in image configuration providing a visual image at one or both of two electrodes between which they are placed. The system employs particles which are photosensitive and which apparently undergo a net change in charge polarity or a polarity alteration upon exposure to activating radiation by interaction with one of the electrodes. Mixtures of two or more differently colored particles are used to secure various colors of images and imaging mixes having different spectral responses. Particles in these mixes may have either separate or overlapping spectral response curves and may be used in subtractive color synthesis.

If several colored particles are used in a system such as that described above, it is probable that these particles are of different sizes and irregular shapes. Because of this and other reasons such as, for example, the fact that several particles may have different charges within the neutral mix, these particles tend to agglomerate together. In a color system these agglomerates cause faulty color images since an irradiated migrating particle may pull with it another particle attached thereto and forming an agglomerate therewith which, otherwise, would not migrate. The reverse may occur and even though a particle is struck by radiometric energy, it will not migrate because it is being held to other particles that are not irradiated by energy striking that area of the suspension. The invention herein functions to break agglomerates, therefore providing better imaging in a system such as that described.

Also, the invention provides for improved inking methods in printing press systems. In existing devices for printing presses many rollers are necessary to meter out a uniform layer of ink to be placed on the press for printing of duplicates. The systems are complex and expensive but are necessary to get a uniformly dispersed, thin layer of particles held within a suspension and forming the ink. By applying the invention herein to the inking system, the necessity for having many rollers is eliminated and a uniform, thin layer can be controlled without the necessity of an excessive number of rollers. The fluid dynamic forces generated by the invention herein will disperse the particles uniformly in the thin layer of ink. It may be that other systems exist or will be discovered or invented that require in their operation suspensions that have some or enough of the properties of the suspensions described herein as being improved by this invention that this invention can be used thereon and such use is contemplated hereby.

Therefore, it is an object of this invention to improve methods and apparatus for breaking interparticle bonds in particle suspensions having agglomerable particles.

Another object of this invention is to improve the characteristics of such suspensions in inking systems.

Still another object of this invention is to improve image quality in certain imaging systems.

A further object of this invention is to improve color separation in particular color imaging systems.

Yet a further object of this invention is to provide relatively uniform, thin layers of suspensions while another object of this invention is to improve image density in imaging systems.

These and other objects, features and advantages of the present invention are achieved by presenting certain external stresses to the suspension which cause internal stresses within the particles, such stresses being large enough to overcome the interparticle force holding particle agglomerates together. These stresses include shear, compressive, and possibly others and are applied prior to use of the suspension in systems requiring such material.

Figure 2:
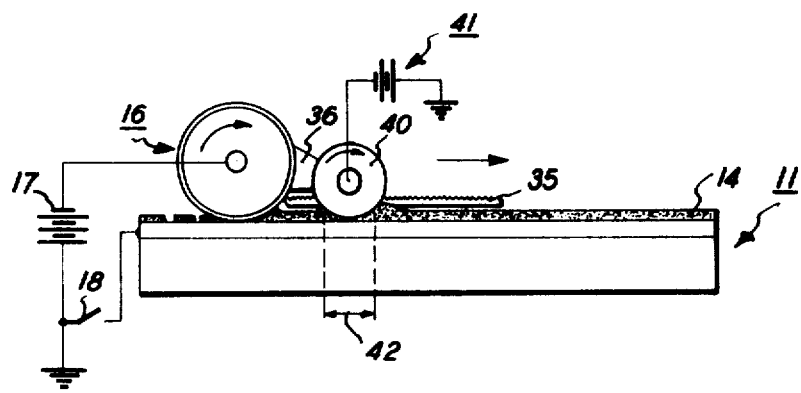
Figure 8:
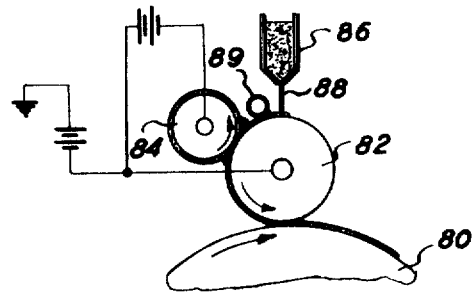
Figure 9:
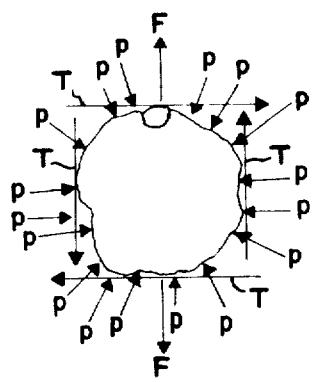
Figure 10:
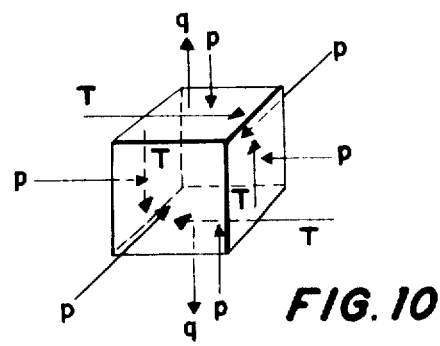

These and other objects and advantages of this invention will become apparent to those skilled in the art after reading the following description taken in conjunction with the accompanying drawings wherein:

FIG. 1 is a schematic representation of an imaging system including one means of providing the necessary stresses;

FIG. 2 diagrammatically shows an imaging system with another means for preparing the imaging suspensions;

FIGS. 3–7 are alternative means for preparing the imaging suspension;

FIG. 8 diagrammatically shows an inking system with a means for providing stresses on the ink;

FIG. 9 shows a force representation on an agglomerated particle within the suspension, and FIG. 10 schematically illustrates the forces on an elemental cube representing a portion of an agglomerated particle as in FIG. 8.

Referring now to FIG. 1, there is shown a transparent electrode generally designated 11 which, for illustration is made up of a layer of optically transparent glass 12 overcoated with a thin optically transparent layer 13 of tin oxide commercially available under the name NESA glass manufactured by Pittsburgh Plate Glass Co. This electrode is referred to as the injecting electrode or imaging electrode. To be coated on the surface of the injecting electrode 11 is a thin layer of finely divided photosensitive particles dispersed in an insulating carrier liquid hereinafter referred to as the suspension. The term "suspension" may be defined as a system having solid particles dispersed in a solid, liquid or gas. Nevertheless, the suspension described in the following illustrations are of the general type including those having a solid dispersed in a liquid carrier. The term "photosensitive" may be defined as applying to any particle which, once attracted to the injecting electrode will migrate away from it under the influence of an applied electric field when it is exposed to activating electromagnetic radiation.

Above the suspension 14 is a blocking electrode 16 which is connected to one side of a potential source 17 through a switch 18. The opposite side of the potential source 17 is connected to the injecting electrode 11 so that when the switch 18 is closed an electric field is applied across the suspension 14 between the electrodes 11 and 16. An image projector made up of a light source 19, a transparency 21 and a lens 22 is provided to expose the suspension 14 to a light image of the original transparency 21 to be reproduced. The optical transparency of the electrode 11 is shown by way of example and does not affect the scope of the invention herein, neither does the particular environment shown for imaging. Of course, this system of exposure is merely illustrative and does not materially affect the invention herein.

The electrode 16 is made in the form of a roller having a conductive central core 24 connected to the potential source 17. The core is covered with a layer of a blocking electrode material 26 which may be Tedlar, a polyvinyl fluoride commercially available from E. I. du Pont de Nemours and Co. Inc., or other material. In this and other embodiments of the imaging system, the particle suspension is exposed to the image to be reproduced while a potential is applied across the blocking and injecting electrodes by closing switch 18. Blocking electrode 16 is caused to roll across the top surface of the injecting electrode 11 with switch 18 closed during the period of image exposure. The exposure causes the exposed particles originally attracted to the electrode 11 to migrate through the liquid and adhere to the surface of the electrode 16 leaving behind a particle image on the injecting electrode surface which is a duplicate of the original transparency 21.

In the embodiment shown in FIG. 1, a stressing roller 30 is positioned to contact the surface 26 of the blocking electrode roller 16 prior to imaging and a suspension deposition means 32 meters out the suspension 14 on the surface 26 of the electrode 16. A doctoring rod 34 of glass or other suitable material causes the suspension passing beneath it to be of a somewhat uniform layer of acceptable thickness. The roller 30 is attached to a motor M-1 which causes the roller 30 to rotate so that it has rapid surface velocity compared to the velocity of the surface 26 of the blocking electrode 16. The roller 30 rotates in a direction shown by the arrow although rotation in either direction is acceptable if the ink passes through the nip. Nevertheless, better results are obtained when the roller rotates in the direction shown. The surface 33 of the roller 30 may be made of conductive, semi-conductive or insulating material. One construction found to be useful and listed for illustrative purposes and not for limitation is an elastomeric layer on a metal core. The roller 30 can be all metal, rigid or elastic, homogeneous or non-homogeneous.

The stressing roller 30, the suspension dispenser 32 and the blocking electrode roller 16 in FIG. 1 are mechanically connected together or housed such that they will translate across the injecting electrode 11 in a fixed relative relationship one to the other as the image is formed to the left side of the blocking electrode roller 16 (as illustrated). The suspension 14 is metered out of the suspension dispenser 32 and passes the doctoring rod 34 according to the thickness requirement of the ink on the electrode 11. This is generally held to a thickness of 1 mil or less on the electrode 11 during imaging at the intersection of the electrode 11 and the electrode roller 16.

A portion of the suspension entering the nip between the roller 30 and the surface 26 of the roller 16 is carried completely around the circumference of the roller 30 and then through the nip several times, and a portion passes directly through the nip. The suspension, whether forced through the intersection of the rollers or around the exit of the nip, encounters pressure and shear stresses. The stressed ink then moves around a portion of the circumference of the roller surface 26 imaged at the intersection between surface 26 and surface 13 of the injecting electrode 11. The suspension not used in the image formed on electrode 11 is carried along the electrode 16 back to the position beneath the suspension deposition means 32 to be mixed with new suspension for further imaging. It may also be removed from the surface 26 by any suitable means. An electrical bias that is negative relative to the blocking electrode 16 is preferably applied to the stressing roller 30 for reasons discussed hereinafter. This is accomplished by connecting an electrical source 31 to the roller 30 or a conductive portion of the roller 30 if it has an insulating layer such as a rubber coating 33.

FIG. 2 illustrates a different embodiment of a system to prestress the imaging suspension prior to the actual imaging by the blocking electrode. The suspension is deposited on the injecting electrode 11 in any suitable manner to insure a more or less thin layer of suspension. Preceding final imaging steps for the system, a roll 40 is rotated to effect a relatively rapid tangential surface velocity compared to its translational velocity. Roll 40 is positioned to contact the suspension on the electrode 11. This surface velocity is in the order of 40 inches per second to 300 inches per second greater than the translational velocity of the roller over the electrode. This causes the suspension 14 to be stressed in the area formed between the electrode 11 and surface of the roller 40. By placing a negative bias on the roller 40 by electrical source 41, it tends not only to create pressure and shear stresses in the area of contact shown as the area 42, but it attracts unwanted positive pigment particles that would not be used in imaging if the injecting electrode is "hole" injecting and biased positive relative to the blocking electrode 16. (More detail as to the imaging process is disclosed hereinafter.) The prestressed suspension is then imaged by the electrode roller 16. A schematic driving system is shown illustrating a rack 35 with suitable gearing on the shafts of rollers 16 and 40 to cause them to traverse the electrode 11. A bracket 36 is shown to move the rollers at the same rate and spacing across the electrode 11. However, it may be desirable to move the rollers independently and eliminate the bracket.

Apparently, there is little difference in results between the system having the stressing roller placed directly against the electrode 11 on previously deposited suspension or on the blocking electrode 16 which also serves to meter out the suspension 14 used for imaging.

Figure 3:
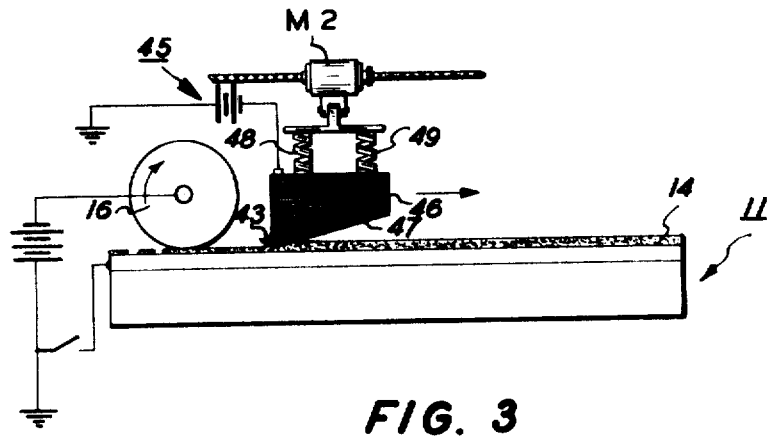

Referring now to FIG. 3 a system similar to that shown in FIG. 2 is utilized for prestressing and imaging of the suspension. Here, however, the apparatus to achieve the prestressing of the suspension is a member 46 having a lower surface 47 angularly displaced from the electrode 11. The member should form a constricting channel with the electrode so that the suspension passing therebetween is subjected to external stresses. The surface may be mechanically biased toward the electrode 11 by springs 48 and 49. The member is tiltable for adjustment of the angle of the converging surface 47 with the electrode by independently maneuvering springs 48 or 49 or any other suitable biasing means.

Motor M-2 causes translational movement of the member 46 over the suspension 14 placed on the biasing electrode thereby developing certain pressure and shear forces in the area of the suspension trapped within the converging space between the surface 47 and the surface 13 of the electrode 11. These shear and pressure forces act in a manner similar to those created by the rollers 30 and 40 in the previous figures to prestress the ink for improved imaging by the electrode roller 16 which operates in a manner substantially the same as that discussed in conjunction with the previous figures. A negative bias from an electrical source 45 is shown in the member 46 to create a field between it and the positive bias placed on the electrode 11. This causes the attraction of positively charged particles within the suspension toward the member 46. As explained hereinafter this permits improved imaging of the remaining particles because of the field arrangement between the electrodes 11 and 16. Because there is an electrical field between member 46 and electrode 11, there may be air breakdown between its trailing edge and the electrode 11. To prevent this a lip portion 43 is added to allow the gap to fill with suspension material rather than air.

The angles shown in these figures are exaggerated for illustrative purposes. Also, although the member 46 is shown as a wedge, it may be any shape as long as its lower surface can develop the proper stresses on the suspension.

Figure 4:
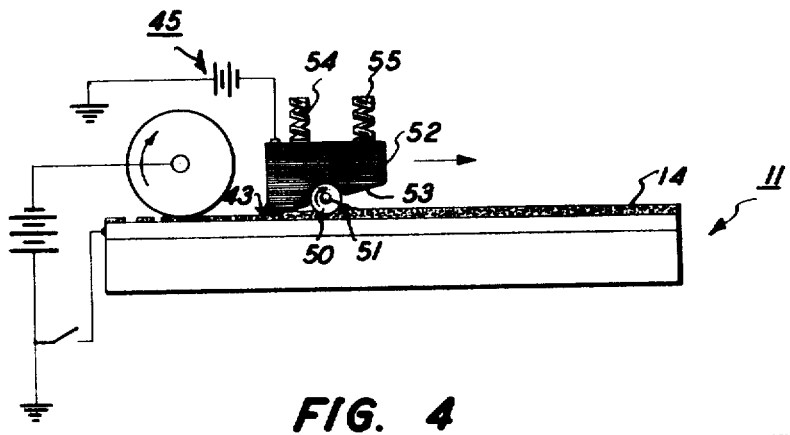

FIG. 4 shows other apparatus for achieving similar results to those described above by basically combining the roller 40 of FIG. 2 and the member 46 of FIG. 3. This combination uses a suspension prestressing roller 50 in combination with a member 52 shaped to accept the roller 50 in its lower surface 53 and create stresses on the suspension flowing between it and electrode 11. The roller 50 journaled for rotation about an axis 51 rotates at a velocity substantially greater than its translational velocity across the electrode 11. This causes shear and pressure stresses similar to those caused by roller 30 in FIG. 1 and roller 40 in FIG. 2. Further the member 52 operating in much the same manner as the member 46 of FIG. 3 causes additional shear, pressure and electrical stresses as described in FIG. 3. Biasing springs 54 and 55 provide a means for adjustability and control of the system. The imaging between the electrode roller 16 and the injecting electrode 11 is the same as described above. A lip 43 is added for reasons stated above.

Figure 5:
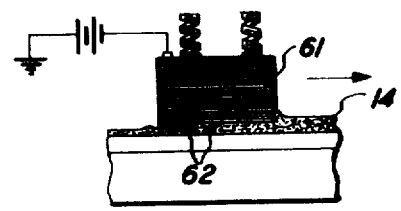

FIG. 5 shows another means for accomplishing the stresses required by providing a step wedge member 61 with a stepped lower surface 62. All other aspects of this figure except for the lower surface shape are the same as FIG. 3 above.

Figure 6:
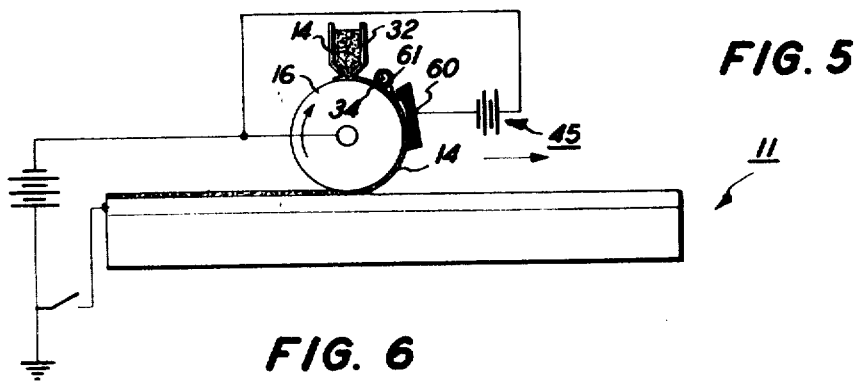

FIG. 6 shows another embodiment of specially shaped member 60 operatively positioned at the electrode 16. The surface 61 of the member 60 adajcent the electrode 16 is arcuate in shape in a manner determined by the surface shape and dimensions of the electrode 16. The shapes should be such that a converging channel is formed for suspension flowing between the parts. Therefore, the distance between the member 60 and the electrode 16 is greater at the ingress point of suspension flow than at the egress point of the suspension flowing between the two parts. The suspension may be metered out by a dispenser 32 and a doctoring rod 34 as has been described. The electrode 16 rotates in the direction shown bringing the suspension 14 through the area between the electrode 16 and the surface 61 of the member 60. The member 60 is stationary relative to the rotation of the electrode 16 but moves with the electrode 16 as it traverses the imaging electrode 11. A bias is applied between the member 60 and the electrode 16 as it was with the stressing roller 30 and electrode 16 in FIG. 1.

Figure 7:
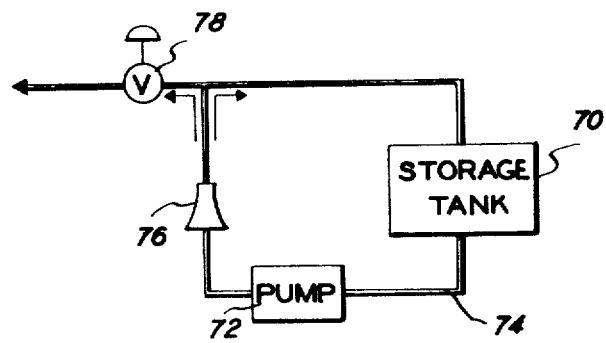

FIG. 7 shows an alternative means for applying stresses to the suspension. Here a storage tank 70 holds the suspension pending its use, e.g., for forming an image. A pump 72 moves the suspension through a line 74 to a nozzle 76 having constrictions therein to cause a shear stress to the suspension particles as the suspension passes through the nozzle 76. A flow control valve 78 is placed in the path of flow of the suspension prior to its being deposited on the electrodes for imaging or to a dispenser. The control valve 78 determines the amount of suspension metered out and there is tubing to allow overflow suspension to return to the storage tank to be recycled.

FIG. 8 shows a system supplying a prestressed marking suspension such as ink for a printing press. Here a printing press with a plate cylinder 80 is inked by an applicator roll 82 which must place a uniofrmly dispersed, thin layer of ink suspension on the press for printing. It is important to get a uniform dispersion and thin layer of ink in order to have acceptable printing whether the copy is solid area, half tone, continuous tone or line representations. By using a very rapidly rotating stressing roller 84 and a suitable metering means such as schematically shown by container 86 having an orifice 88 therein and a doctoring rod 89, the interaction at the nip between rollers 82 and 84 causes a uniform dispersion of the particles in the carrier making an acceptable layer of uniformly dispersed particles of ink for the press. The thickness of the layer is determined by the contact pressure between the two rollers 82 and 84, the relative surface velocity of rollers 84 and 82, and the amount of ink metered through the orifice 88 of the container 86 and past the doctor blade 89. An electrical bias is placed on the gap between the rollers 82 and 84. The direction and magnitude of the bias depends on the particular inks used. The field will aid in the dispersing of the particles in the ink layer. The high speed stressing roller applies the ink electrophoretically since a field is maintained between the stressing roller and the electrode roller during operation for preferred results. The combined application of the suspension electrophoretically with a very rapidly overdriven stressing roller is a novel means of inking many types of machines and apparatus with a wide variety of suspensions or inks. This method of inking is usable on such machines as printing presses. The high cyclic speed of the inking roller averages the imperfections in roller surfaces as well as other machine imperfections and interrelations of parts. The improvement is in such a manner that a relatively uniform layer of ink is produced in the nip between the high speed roller and an applicator roller positioned adjacent the surface of the high speed roller. This method of applying ink will give a uniform dispersion of a layer of the ink while correcting for such defects as eccentricity within tolerance levels. This apparatus can be used as a substitute for the multiple rollers necessary to apply a uniform layer of ink to printing presses which currently exist in the art.

FIG. 9 schematically illustrates a greatly enlarged microscopic agglomerate of particles held within a suspension. The arrows on the figure indicate the stresses acting upon this agglomerate of particles. The particles may be the same material, size or charge or different in any or all of these parameters. They may represent the three colors used in subtractive color synthesis. When a shear stressing force and a compressive force are applied to the agglomerate, the shear forces cause internal stresses within the particles and the agglomerate itself and cause a fracturing along the weakest lines thereof. The weakest portions of the agglomerates are generally the interfaces of the individual particles. Therefore, the fracturing tends to occur between the particles within the agglomerate causing each particle to free itself from the others and remain in an independent state ready to be acted upon by other forces such as the electric field and electromagnetic radiation during imaging. The fracturing may occur from shear or tensile stresses on the particle even though only shear, compressive and electrical forces are placed on the suspension.

Although the shearing of the suspension is illustrated as immediately preceding imaging in the several embodiments illustrated, it has been experimentally shown that an hiatus of at least several hours and even considerably longer can intervene between the action of the shear stress means and the imaging of the suspension without recombination of the fractured agglomerates occurring.

OPERATION OF IMAGING SYSTEM

A detailed description of the operation and theories relating to the actual imaging system improved by this invention and discussing the interatcion of the particles in the suspension with the electrodes 11 and 16 is disclosed in Pat. No. 3,383,993 issued on May 21, 1968 in the name of S. Yea. The system therein described and the one used here as an imaging embodiment for this invention provides an electric field across the imaging area such that the electrode 11 is positive and the electrode 16 is negative with respect to each other. Therefore particles within the suspension that are negatively charged will attract themselves to the position hole-injecting electrode 11.

When the switch 18 is left in the open position as shown in the figures and no potential is applied across the electrodes 11 and 16, the suspended particles merely assume random positions in the carrier. However when the switch 18 is closed, thereby rendering the conductive surface 13 of electrode 11 positive with respect to the surface 26 of the blocking electrode 16, negatively charged particles within the system tend to move toward the electrode 11 while any positively charged particles in the system would move toward the blocking electrode 16. This, of course, is without the influence of any exposure radiation to form an image between the two electrodes.

The same phenomenon with the positive and negative particles occurs with respect to the stressing roller 30 and the blocking electrode 16 in FIG. 1 or the stress forming mechanism and the electrode 11 in the other figures shown. The stressing mechanism is biased negatively compared to the electrode surface with which it interacts. Therefore, the positively charged particles within the suspension are attracted to the stressing mechanism where they will tend to cling and not interfere with the later imaging process which is to take place.

The particles within the suspension are non-conductive when not being struck with activating radiation. The negative particles come into contact with or are closely adjacent to the injecting electrode 11 and remain in that position under the influence of the applied electric field until they are subjected to exposure to activating electromagnetic radiation. The particles bound on the surface of the injecting electrode 11 make up the potential imaging particles for the final image to be reproduced thereon. When activating radiation strikes the particles, it is absorbed by the photosensitive particle and makes the particle conductive "creating" hole-electron pairs of charge carriers which may be considered mobile in nature. These newly created hole-electron pairs within the particles are thought to remain separated before they can combine due to the electrical field surrounding the particle between the two electrodes. The negative charge carriers of these hole-electron pairs move toward the positive electrode 11 while the positive charge carriers move toward the electrode 16. The negative charge carriers near the particle-electrode interface at electrode 11 can move across the very short distance between the particle and the surface 13 leaving the particle with the net positive charge after sufficient charge transfer. These net positively charged particles are now repelled away from the positive surface of electrode 11 and attracted to the negative blocking electrode 16. Accordingly, the particles struck by activating radiation of a wavelength with which they are sensitive, i.e., a wavelength which will cause the formation of hole-electron pairs within the particles, move away from the electrode 11 to the electrode 16 leaving behind only particles which are not exposed to sufficient electromagnetic radiation in their responsive range to undergo this change.

Consequently if all the particles in the system are sensitive to one wavelength of light or another and the system is exposed to an image with that wavelength of light, a positive image will be formed on the surface of electrode 11 by the subtraction of bound particles from its surface leaving behind bound particles in unexposed areas. If all the polarities on the system are reversed, electrode 11 will preferably be capable of accepting injected holes from bound particles upon exposure to light and electrode 16 will be a blocking electrode incapable of injecting holes into the particles when they come into contact with the surface of this electrode. The system may be operated with dispersions of particles which initially take on a net positive charge or a net negative charge and even with systems where the particles in the suspension apparently take on both polarities of charge. In this latter instance, the bias placed on the stressing mechanism will help remove the particles of unwanted polarity from the imaging system.

Typical voltages employed in the system for imaging while exposing may be in a range of 300 to 5,000 volts. Depending on the particular use to which the system is to be put, the suspension 14 may contain one, two, three or more different particles of various colors and having various ranges of spectral response. In a monochromatic system the particles included in the suspension 14 may be of any color and produce any color and the particular point or range or spectral response is relatively immaterial as long as it shows response in some region of the spectrum which can be matched by a convenient exposure source. In polychromatic systems, the particles may be selected so that particles of different colors respond to different wavelengths in the visible spectrum thus allowing for color separation. Regardless of whether the system is employed to produce monochromatic or polychromatic images it is desirable to use particles which are relatively small in size because smaller particles produce better and more stable dispersions in the suspension and are capable of forming images of higher resolution than would be possible with particles of larger size.

When the particles are suspended in the carrier, they may take on a net electrostatic charge so that they may be attracted toward one of the electrodes in the system depending on the polarity of its charge with respect to that of the electrodes. Some of the particles in the suspension may be positive, other negative and some even bipolar. The "wrong" polarity of particles of the suspensions may affect the imaging capabilities of the system by masking some of the "right" particles, or by agglomerating with some of the "right" particles in the system before imagewise particle migration takes place. In other words, the above behavior causes a portion of the suspended particles to be removed from the system as potential imageformers while others stay behind.

By electrically biasing the stressing mechanism, particles of the "wrong" polarity can be removed from the suspension or at least substantially separated from the electrode contacted by the stressing mechanism. The stresses break the agglomerated particles and then the bias takes "wrong" charged particles out of the system prior to imaging. If the stressing mechanism is not biased, it will nevertheless still function to break up agglomerates, but without the additional benefit of removing particles that cannot image in the system.

Consider a three color subtractive system where the suspension contains individual particles of a magenta, yellow and cyan color which are sensitive to green, blue and red wavelength radiation respectively. Assume that green light exposes the electroconductive glass processing the tri-mix (suspension with the three color particles mentioned above). Under optimum conditions the magenta particles absorb the light while the cyan and yellow particles reflect the light. The particles made conductive by absorbing the radition exchange charge with the electroconductive glass as mentioned above. The magenta particles, as a result of their activation by exposure to the green light, become positive and migrate away from the injecting electrode. The cyan and yellow particles remain generally insulating and are not affected since they have little or no photosensitivity in the green light range of the spectrum. The magenta particles migrate selective as made conductive to the negative blocking roller or electrode. Thus, a color reproduction of the original green light is obtained in image configuration on the injecting electrode by subtractive color. That is, the cyan and yellow pigments remaining appear green when viewed.

THEORY OF OPERATION

One of the limitations in effective color separation by the photoelectrophoretic technique just described is the agglomeration of different color pigment particles to each other. The invention described herein breaks up these particle agglomerates allowing truer color separation and improved imaging. The theories, structures and methods discussed herein relating to the invention described are equally valid and applicable to monochromatic systems and inking systems not utilizing photoelectrophoresis and even other imaging techniques. The particles in the suspension are known to form agglomerates due to the electrostatic and Van der Waal's (intermolecular) forces as well as small mechanical interlocking forces. These forces are significant compared to the electrostatic forces operating on the overall suspension, and are responsible for particle packing within the suspension because of the close proximity of the pigment particles.

In a polychromatic system, the agglomerations, which result because of these particle packings and because of other reasons such as ball milling during pigment preparation, consist of multi-colored pigment particles with an overall net negative or net positive charge. When the agglomerate behaves as a unit instead of discretely, an error in color separation results because the non-illuminated particles migrate erroneously wtih the illuminated particles, or the illuminated particles fail to migrate because they are bonded to the non-illuminated pigment particles.

In a monochromatic system the particles will migrate if energy of any wavelength within the panchromatic spectrum of the particle response strikes the particle. It is believed that energy absorption and response thereto by the particles relate to the surface area of the particle available to be struck. The area-to-mass ratio of these particles is decreased if several of them agglomerate together. Therefore greater amounts of energy are required in order to cause the migration of the agglomerated particle than would be necessary to cause the migration of the individual particles not attached to each other.

Once the magnitudes of the bonding forces internal to the agglomerates are determined, the critical stresses necessary to overcome these forces in order to affect structural failure must be generated. This is accomplished by increasing the external state of stress thereby causing the internal state of stress within the particle agglomerates to exceed the stress level necessary to cause agglomerate particle failure. By causing this structural failure particle separation and therefore better imaging can be effected.

The forces external to the agglomerated particles exerted by the stressing mechanism operates in the contact zone between the surface of the stressing mechanism and the electrode upon which it acts. There are three distinct forces present in this contact zone which act upon the agglomerated suspension. These forces are a fluid dynamic shear force, a fluid dynamic compressive force and an electrical field force if a field is applied. The theory is that when the threshold failure stress is exceeded, the agglomerate particle is severed and particle (color) separation is obtained. This dismemberment is a structural failure that must subscribe to one of the general prevailing failure theories for solid bodies. The forces normally acting upon the particles in the suspension during imaging are too small to affect particle structural failure. In fact, only in the presence of the fluid dynamic stresses and compressive forces, is there enough of a resultant stress available to sever the agglomerate particles and produce improved imaging and color separation in a polychromatic system. Since this theory has been experimentally shown to be operative and to create both better color separation and image quality, there is, of course, no intention to limit the invention to this theory of operation which is only given to clarify the results obtained with the method and structure disclosed herein and describing this invention.

EXPERIMENTAL RESULTS

The following examples were carried out in an apparatus of the general type illustrated in FIG. 1. The stressing roller 30 was approximately 2.5 inches in diameter. The imaging velocity which is equal to the translational velocity of electrode roller 16 was about 1.5 inches per second. The plate employed was approximately 4 inches by 4 inches and was exposed to the light intensity of 200–300 foot candles. A suspension of 845 grams per liter of the indicated particles were held in the suspension having mineral oil for a carrier. The magnitude of the applied potential between the two electrodes during imaging was 2,000–4,000 volts. The pigments which were present as particles in the suspension were ground in a ball mill for 48 hours to reduce the size to make a more stable dispersion to improve the resolution of the final images.

The pigments themselves were as follows:

Monolite Fast Blue GS (cyan) mixture of the alpha and beta metal free phthalocyanine—Arnold Hoffman Co.

Watchung Red B (magenta) C.I. No. 15865 1-(4'-methyl-5'-chloroazobenzene-2'-sulfonic acid)-2-hydroxy-3-naphthoic acid.—Made by Du Pont.

Yellow pigment having the following structure and prepared in accordance wtih application Ser. No. 421,281 filed on Dec. 28, 1964, now U.S. Patent 3,447,922. N-2''-pyridyl - 8,13 - dioxodinaphtho - (2,1–2',3') - furan - 6-carboxamide.

Exposure was made with a 2,800°–3,400° K. lamp through a continuous tone neutral density gray scale laminated over several primary color and neutral interference filters to make a color wedge to measure the sensitivity of the suspension.

Besides the above parameters the stressing roller 30 velocity was 131 inches per second relative to the electrode roller 16 velocity and in the direction shown in FIG. 1. The stressing roller had a bias of —125 volts relative to the electrode roller 16. The maximum hydrodynamic ink pressure developed was 15 p.s.i. The following results were observed by illumination with a tungsten lamp through the transparency test subject referred to above. A representative set of data comparing optimized results with the stressing roller and results obtained without the stressing roller follows; $\Delta D$=(analytical density of stress experiment)—(analytical density of non-stress control):

| Color patch | Changes in analytical density of component pigments | | |
| --- | --- | --- | --- |
| | $\Delta D$ Cyan | $\Delta D$ Magenta | $\Delta D$ Yellow |
| Cyan | +.62 | +.10 | —.06 |
| Magenta | +.16 | +.66 | —.41 |
| Yellow | +.12 | +.09 | +.17 |
| D min. Neutral | +.10 | +.09 | +.12 |

A change in density was noticed with a relative velocity between the stressing roller 30 and the blocking electrode roller 16 of as low as 20 inches per second with a charge differential of —100 volts from the stressing roller relative to the electrode roller and a hydrodynamic ink pressure of 5 p.s.i.

Improvements in the image density were also observed with a relative velocity difference between the stressing roller and the electrode roller 16 of 260 inches per second with a bias difference of —600 volts from the stressing roller relative to the electrode roller 16 and a hydrodynamic ink pressure of 30 p.s.i.

The above mentioned parameters are not meant to be critical and some of the parameters noticed experimentally were not necessarily limits on the method or system. Some of the results were reached only because of the limitations of the mechanisms used for the experiments and should not be considered critical limitations above or below which no beneficial effect will be noted with a particular suspension.

Several assumptions are made in order to generalize the application of forces to particle suspensions different from the one tested. Basically the internal stresses involved in forming and holding agglomerates together are very small and this is what must be overcome to achieve particle separation. Even in particle suspensions other than the one tested, the forces maintaining interparticle attraction are relatively small compared to the forces exerted by the structure herein described. Because of the great variability permissible with the structure and method used herein, the shear stress may be multiplied by 100× and more without greatly affecting the system. Therefore with any given suspension, even one with interparticle holding forces more than 100× greater than the suspension tested, the proper stress forces to break up the agglomerates can be determined and the structures and methods herein disclosed can be used to generate those forces.

The theory herein is applicable to particle suspensions for electrophoretic imaging or for inking or for any other use where small individual particles are desired for better performance than agglomerates of several particles.

MATHEMATICAL MODEL

The following is a mathematical model explaining the interrelationships between the viscosity of the suspension, and the electrical, fluid dynamic shear, and fluid dynamic compressive stresses for any system. By applying the various known quantities of a system to the formula the shear force or pressure or electrical force necessary to break up agglomerates of a particle suspension with a known viscosity can be determined.

It is believed that methods and apparatus for increasing maximum shear stress acting on the particles of a suspension will improve separation of the agglomerate particle structures and therefore improve the use of the suspension in imaging systems, color separation systems, and/or in uniform layer applications for such systems as inking of presses.

The apparatus and methods described embodying this invention exert external forces upon the agglomerated particles sufficient to raise the stress level within the agglomerated particle to the critical value necessary for structural separation of the agglomerate into discrete particles.

The values necessary for breaking up the agglomerated particles in order to improve both imaging and color separation in multi-color systems or imaging in monochromatic systems are determinable based on several variables within the imaging apparatus and the suspension itself. The following mathematical model describes the necessary parameters in order to achieve the desired results described herein. Relative to this model attention is drawn to FIGS. 9 and 10.

FIG. 9 is an illustration of an agglomerated particle assumed to be within the contact zone such as zone 42 of FIG. 2 between the stressing roller and the electrode with which it operates. FIG. 9 also shows representative forces acting upon the particle held within the suspension. The forces marked F represent the electrical field force acting on the particle, the forces marked $p$ represent the pressure acting on the agglomerate which is equal to the pressure within the suspension in the vicinity of the agglomerate, and T represents the shear stress acting on the agglomerate or the shear stress within the suspension at the contact zone.

FIG. 10 represents an elemental cube taken within the agglomerated particle to represent the stresses on that particle in simplified mathematical terms. Here the stresses represented by a $p$ is the pressure exerted through the suspension on the particle and therefore the elemental cube within the particle. The electrical stress acting upon the particle is represented by $q$ and the shear stress on the elemental cube is represented by the T.

Viewing the elemental cube as existing within an agglomerate in the contact zone and considering the shear stress on the agglomerate and within the suspension in that zone as caused by a uni-directional viscous flow, the shear stress $$T = \mu \frac{dV}{dy}$$

where $\mu$ is the apparent viscosity of the suspension, and $dV/dy$ is the shear rate within the fluid. The force F shown in FIG. 9 which acts upon the particle generates an electrical stress $q$ such that $q=F/D^2$ where D is a characteristic length of the particle. This stress is uni-directional because of the characteristics of the electrical field in the contact zone.

From the illustrations of FIGS. 9 and 10 the following component stresses within the agglomerate can be found. It is assumed that the values of the stresses are maximal at the intersection of the vertical center line of the stressing mechanism and the tangential plane of the electrode which it contacts.

$$\sigma_p^3 + (3p-q)\sigma_p^2 = (3p^2 - 2pq - T^2)\sigma_p + (p^3 - p^2q - pT^2) = 0$$

$$T_{max} = \frac{\sigma_{p1} - \sigma_{p3}}{2}$$

$$\Sigma_o = \tfrac{1}{3}(\sigma_{p1} + \sigma_{p2} + \sigma_{p3})$$

$$T_o = \tfrac{1}{3}\sqrt{(\sigma_{p1}-\sigma_{p2})^2 + (\sigma_{p2}-\sigma_{p3})^2 + (\sigma_{p3}-\sigma_{p1})^2}$$

In the above formula relationships: $\sigma_p$ is the principal stress which has three components $\sigma_{p1}$, $\sigma_{p2}$ and $\sigma_{p3}$ related such that $\sigma_{p1} > \sigma_{p2} > \sigma_{p3} >$ and these are stress components within the particles.

$\Sigma_o$ is the octahedral shear stress component within the particle, $p$ is the dynamic pressure within the fluid, $q$ is the electrical stress acting upon the particle, T is the dynamic shear stress within the fluid, and $T_{max}$ is the maximum shear stress, a stress component within the particle.

When the stress component which characteristically determines structural failure of the agglomerate particle, such as, for example, the shear stress, exceeds the critical level for agglomerate fracture, the agglomerate separates into discrete particles. These discrete particles can then function separately in the manner described herein to function better within the system in which they are employed.

Although the mathematical model explaining the failure theory of the agglomerated particles is based on maximum shear stress theory of failure, the experimentally provable agglomerate failures could be explained by other failure theories such as a principal stress theory. Nevertheless apparatus or methods employed for breaking agglomerates in suspensions such as those described herein that come within the hear stress mathematical model are of the type contemplated by this invention, even if actual agglomerate failure is explainable by some other theory.

The theories expounded above and experiments conducted in accordance with these theories indicate another very useful benefit from the overdriven high speed roller such as shown in FIG. 1. When operating in the configuration shown in these figures, a relatively uniform thin layer suspension is left on the member adjacent the high velocity roller after it has been contacted by the high velocity roller. There is enough uniformity in the layer remaining on the member that the method or amount of manual application of the suspension does not substantially affect the experiments such as those described above.

While this invention has been described with reference to the structures disclosed herein, it is not confined to the details set forth; and this application is intended to cover such modifications or changes as may come within the purposes of the improvements or the scope of the following claims.

What is claimed is:

1. In a photoelectrophoretic imaging system of the type including subjecting a layer of a particle suspension capable of agglomerating to an applied field between two or more electrodes in the presence of activating electromagnetic radiation in image configuration, the improvement comprising breaking agglomerate particles in the suspension prior to imaging by
providing a supply of the suspension,
applying a fluid dynamic compressive stress to the suspension,
applying a fluid dynamic shearing stress to the particles within the suspension simultaneously with said fluid dynamic compressive stress the combination of the two having a resultant stress sufficient to overcome interparticle stresses binding particles as agglomerates within the suspension.

2. The method of claim 1 including applying an electrical field across the suspension while said compressive and said shear stresse are applied thereto.

3. The method of claim 2 wherein said electrical field is in the range of 50 to 600 volts.

4. The method of claim 1 wherein said shear stresses on the particles in the suspension are within a range of from 5 to 30 pounds per square inch and the fluid dynamic compressive stresses on the suspension are between 10 and 20 pounds per square inch.

5. The method of claim 1 including coating the suspension on one of the electrodes during the application of said stresses to the suspension.

References Cited

UNITED STATES PATENTS

| | | | |
|---|---|---|---|
| 1,900,216 | 3/1933 | Witt | 106—309 |
| 1,934,637 | 11/1933 | Ratton | 106—309 |
| 1,961,229 | 6/1934 | Ladrette | 106—309 |
| 2,021,143 | 11/1935 | Calclott et al. | 106—309 |
| 2,163,649 | 6/1939 | Weaver | 106—309 |
| 2,637,535 | 5/1953 | Arnold | 106—309 |
| 2,999,762 | 9/1961 | Verdeer | 106—309 |
| 3,135,474 | 6/1964 | Schold | 241—21 |
| 3,384,566 | 7/1967 | Clark | 204—181 |
| 3,473,940 | 10/1969 | Walsh | 106—309 |
| 3,474,019 | 10/1969 | Krieger | 204—181 |

GEORGE F. LESMES, Primary Examiner

J. C. COOPER, Assistant Examiner

U.S. Cl. X.R.

96—1, 1.3, 1.4; 209—5; 210—57; 252—381; 106—309